(12) United States Patent
Earith et al.

(10) Patent No.: US 8,002,864 B2
(45) Date of Patent: Aug. 23, 2011

(54) DE-OILER SYSTEM FOR AN AIRCRAFT ENGINE

(75) Inventors: Thomas Julien Roland Earith, Veneux les Sablons (FR); Gerard Philippe Gauthier, Champagne sur Seine (FR); Serge Rene Morreale, Guignes (FR)

(73) Assignee: SNECMA, Paris (FR)

( * ) Notice: Subject to any disclaimer, the term of this patent is extended or adjusted under 35 U.S.C. 154(b) by 646 days.

(21) Appl. No.: 12/038,398

(22) Filed: Feb. 27, 2008

(65) Prior Publication Data

US 2008/0202082 A1 Aug. 28, 2008

(51) Int. Cl.
*B01D 46/18* (2006.01)

(52) U.S. Cl. ................. 55/409; 55/400; 55/406; 55/408

(58) Field of Classification Search ............... 55/400, 55/406, 385.3, 385.1, 317, 525, DIG. 19, 55/DIG. 28, DIG. 30; 95/270, 277
See application file for complete search history.

(56) References Cited

U.S. PATENT DOCUMENTS

| | | | | |
|---|---|---|---|---|
| 3,022,776 A | * | 2/1962 | Steinlein et al. ............ | 123/73 A |
| 3,561,195 A | * | 2/1971 | Bouru ............................ | 55/409 |
| 4,217,120 A | * | 8/1980 | Reynolds ..................... | 55/385.1 |
| 4,714,139 A | * | 12/1987 | Lorenz et al. ................ | 184/6.11 |
| 5,114,446 A | | 5/1992 | Giersdorf et al. | |
| 5,716,423 A | * | 2/1998 | Krul et al. ..................... | 55/485 |
| 5,776,229 A | * | 7/1998 | Blanes et al. ................. | 96/188 |
| 5,954,035 A | * | 9/1999 | Hofer et al. ................... | 123/573 |
| 6,033,450 A | | 3/2000 | Krul et al. | |
| 6,109,250 A | * | 8/2000 | Haberlein et al. ............ | 123/572 |
| 6,139,595 A | * | 10/2000 | Herman et al. ............... | 55/312 |
| 6,398,833 B1 | * | 6/2002 | Santerre et al. ............... | 55/409 |
| 6,858,056 B2 | * | 2/2005 | Kwan ............................ | 55/400 |
| 7,033,410 B2 | * | 4/2006 | Hilpert et al. ................. | 55/394 |
| 7,566,356 B2 | * | 7/2009 | Latulipe et al. ............... | 55/400 |
| 7,717,101 B2 | * | 5/2010 | Beetz et al. ................... | 123/572 |
| 2005/0211093 A1 | * | 9/2005 | Latulipe et al. ............... | 95/270 |
| 2006/0248865 A1 | * | 11/2006 | Latulipe et al. ............... | 55/400 |
| 2007/0000730 A1 | * | 1/2007 | Regonini ..................... | 184/6.23 |
| 2007/0294986 A1 | * | 12/2007 | Beetz et al. ................... | 55/385.3 |

FOREIGN PATENT DOCUMENTS

| | | |
|---|---|---|
| EP | 0 780 546 A1 | 6/1997 |
| EP | 1 344 559 A1 | 9/2003 |
| EP | 1 728 975 A1 | 12/2006 |
| FR | 2 696 655 A1 | 4/1994 |

\* cited by examiner

*Primary Examiner* — Duane Smith
*Assistant Examiner* — Sonji Turner
(74) *Attorney, Agent, or Firm* — Oblon, Spivak, McClelland, Maier & Neustadt, L.L.P.

(57) ABSTRACT

A de-oiler system for an aircraft engine including a casing defining a volume containing a rotary shaft and a mixture of air and oil for processing is disclosed. The system includes a hollow rotary axle; a de-oiler structure fastened to the hollow rotary axle and rotating together with the hollow rotary axle, the de-oiler structure having an inlet first face communicating with the volume and an outlet second face connected to a passage formed in the hollow rotary axle; and a transmission device between the hollow rotary axle and the rotary shaft for communicating to the hollow rotary axle a speed of rotation V about its axis in such a manner that the speed of rotation V is greater than a speed of rotation v of the rotary shaft.

12 Claims, 2 Drawing Sheets

DE-OILER SYSTEM FOR AN AIRCRAFT ENGINE

The present invention relates to a de-oiler system for an aircraft engine and to an aircraft engine including such a de-oiler system. In an aircraft engine, particularly a turbojet, oil flows are circulated toward certain components to perform lubrication functions. After being introduced into components that need lubrication, the oil is recovered, recycled, and re-injected into the oil flows of the lubrication circuit.

Nevertheless, lubrication circuits are not completely leak resistant resulting in losses that define oil consumption of the engine.

BACKGROUND OF THE INVENTION

The main source of oil leakage is found in the system for de-oiling the air from engine enclosures associated with the front and rear bearings of the engine: air flows to the bearing enclosures between parts that are rotary and stationary, and air picks up oil that is subsequently vented to the outside through a de-oiler system. Increasing the air/oil separation power of the de-oiler system makes it possible to reduce the oil consumption of the engine, or the turbojet, and thus reducing the operational cost.

Accompanying FIG. 1 shows an example of a known de-oiler system mounted in the rear bearing enclosure of a turbojet. This figure shows a rear bearing enclosure 10 and a hollow rotary shaft 12 (which also can be called "degassing shaft/tube" or "gas recovery shaft/tube") for recovering gas that comes from a front bearing enclosure. It also shows pressurization tubes 14 that enable air to be injected into the enclosure 10 in order to prevent fluid entering into the enclosure.

De-oiling proper is obtained with the help of a centrifugal de-oiler 16 of annular shape that is mounted on the hollow rotary shaft 12. The inlet face 16a of the de-oiler 16 is in contact with the oil-laden air contained in the enclosure 10, while its outlet 16b communicates with the hollow rotary shaft 12. The centrifugal de-oiler 16 is constrained to rotate with the hollow rotary shaft 12. In simplified manner, the de-oiler 16 is constituted by a plurality of microchannels, e.g. constituted by a honeycomb structure, with the edges of the inlet face 16a tending, under the effect of the de-oiler rotating, to remove the oil droplets that are sent towards the enclosure 10 while allowing air to pass towards the hollow rotary shaft 12 under the effect of the pressure that exists in the enclosure 10. This thus separates the oil from the air, the oil being recovered by a pump circuit opening out into the bottom portion of the enclosure 10, which circuit is not shown in FIG. 1.

In such a system, the speed of rotation of the de-oiler 16 is naturally determined by the speed of rotation of the hollow rotary shaft 12. It is found that with such a system, the rate at which oil is separated from the air is significantly less than the target rate, and that this gives rise to increase oil consumption.

OBJECTS AND SUMMARY OF THE INVENTION

An object of the present invention is to provide a de-oiler system for an aircraft engine enabling improvement of the rate at which lubricating oil is recycled, i.e. the rate at which oil is separated from air, without significantly complicating the structure, e.g. of the rear bearing enclosure of the aircraft engine.

According to the invention, to achieve this object, a de-oiler system for an aircraft engine having a casing defining a volume containing a mixture of air and oil for processing and a hollow rotary shaft comprises:

a hollow rotary axle distinct from said hollow rotary shaft;

a de-oiler structure fastened to said hollow rotary axle and rotating together with said hollow rotary axle, said de-oiler structure having an inlet first face communicating with said volume and an outlet second face connected to a passage provided in said hollow rotary axle; and transmission means between said hollow rotary axle and said hollow rotary shaft for communicating to said hollow rotary axle a speed of rotation V about its axis in such a manner that said speed of rotation V is greater than the speed of rotation $\underline{v}$ of said hollow rotary shaft, whereby the oil droplets contained in the air inside the casing are moved apart towards a casing of the inlet first face of said de-oiler structure and the processed air is collected by said passage of the hollow rotary axle.

It can be understood that in the invention the de-oiler structure is driven at a speed of rotation that is no longer the speed of rotation of the hollow rotary shaft, but at a speed of rotation that can be defined by selecting an appropriate ratio between the speed V and the speed v for optimizing the operation of the de-oiler structure.

In addition, it can be seen that even though the de-oiler structure constitutes an additional part, it does not alter the general organization of the bearing enclosure that usually constitutes the casing in which de-oiling is performed.

Preferably, the axes of said hollow rotary axle and of said hollow rotary shaft are parallel. Thus, implementing the transmission is significantly simplified.

Preferably, said transmission means comprise a first pinion mounted on said hollow rotary axle co-operating with a second pinion mounted on said hollow rotary shaft.

Also preferably, said hollow rotary axle passes through a wall of said casing and a labyrinth type gasket is interposed between said hollow rotary axle and the wall of said casing.

Also preferably, bearings secured to a casing wall are provided, in which bearings said hollow rotary axle is mounted to enable it to be centered.

Also preferably, the de-oiler structure is of the metal foam type.

The invention also provides an aircraft engine or more particularly an airplane turbojet wherein its de-oiler system is in accordance with the above-specified characteristics, the de-oiler system preferably being mounted in an enclosure associated with a rear bearing. It may also optionally be mounted in a front bearing enclosure, or indeed between the two enclosures.

BRIEF DESCRIPTION OF THE DRAWINGS

Other characteristics and advantages of the invention appear better on reading the following description of a preferred embodiment of the invention, given by way of non-limiting example. The description refers to the accompanying figures, in which.

MORE DETAILED DESCRIPTION

Figure 1:
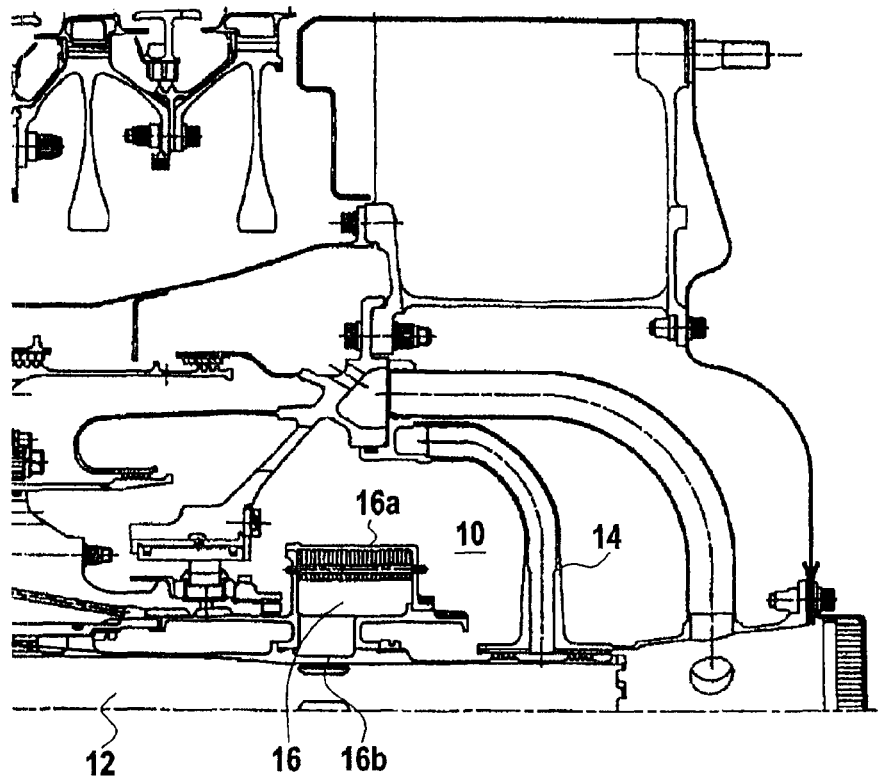
FIG. 1, described above, shows a prior art de-oiler system mounted in a rear bearing enclosure of a turbojet.

With reference to FIGS. 2, 3A, 3B, and 3C, there follows a description of the general organization of a de-oiler structure in accordance with the invention, mounted in the rear bearing enclosure 10 of an aircraft engine, or more precisely of a turbojet. In this figure, there can be seen once more not only the rear bearing enclosure 10, but also the hollow rotary shaft 12 coming from a front bearing enclosure, and air flow is represented by arrows A, while air-oil mixture flow is represented by arrows AH.

The de-oiler structure given overall reference 20 is essentially constituted by a hollow rotary axle 21 having an annular centrifugal de-oiler structure 22 mounted thereon. The hollow rotary axle 21 is preferably mounted in such a manner that its axis XX' is parallel to the axis YY' of the hollow rotary shaft 12. Nevertheless, these axes need not be mutually parallel. The hollow rotary axle 21 is mounted into two series of bearings 24 and 26, themselves mounted into support structures 28 and 30 secured to the rear bearing enclosure. The annular centrifugal de-oiler structure 22 has an outer inlet face 22a that is directly in contact with the volume defined by the rear bearing enclosure 10, and an inner outlet face 22b that is connected to the passage 34 defined by the hollow rotary axle 21. The hollow rotary axle 21 has a first end 21a that is closed and a second end 21b that is open and that enables air to be recovered from the outlet of the de-oiler structure 20. In order to provide sealing relative to the hollow rotary axle 21, labyrinth type gaskets 40 and 42 are mounted firstly on the outside face of the hollow rotary axle 21 and secondly on the pressurization pipes 14.

Figure 3A:
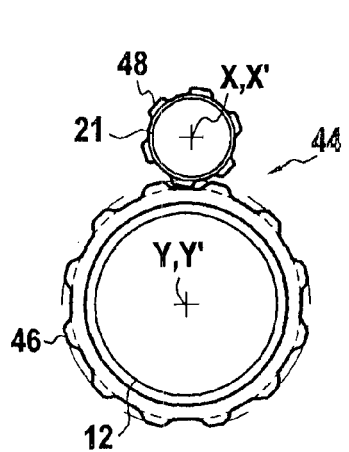
FIG. 3A is a cross-section view on line A-A of FIG. 2.

With reference FIG. 3A, there follows a description of a preferred embodiment of the mechanical transmission between the hollow rotary shaft 12 and the hollow rotary axle 21 of the de-oiler structure 20. Preferably, the transmission system given overall reference 44 is constituted by two pinions 46 and 48 mounted respectively on the outside face of the hollow rotary shaft 12 and on the outside face of the hollow rotary axle 21 of the de-oiler structure. It will be understood that by appropriately defining the pinions 46 and 48, it is possible to give the hollow rotary axle 21a speed of rotation V about its longitudinal axis XX', which speed is well defined and suitable for optimizing de-oiling operation. The speed V is greater than the speed v of the hollow rotary shaft 12.

Figure 3B:
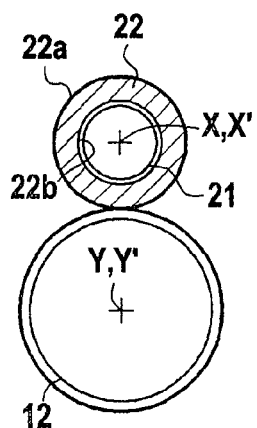
FIG. 3B is a cross-section view on B-B of FIG. 2.

FIG. 3B shows the hollow rotary shaft 12, the hollow rotary axle 21, and the annular centrifugal de-oiler structure 22 with its outer inlet face 22a and its inner outlet face 22b.

Figure 3C:
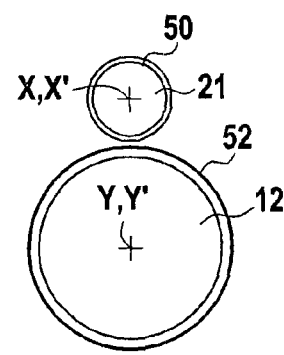
FIG. 3C is a cross-section view on line C-C of FIG. 2.
Figure 2:
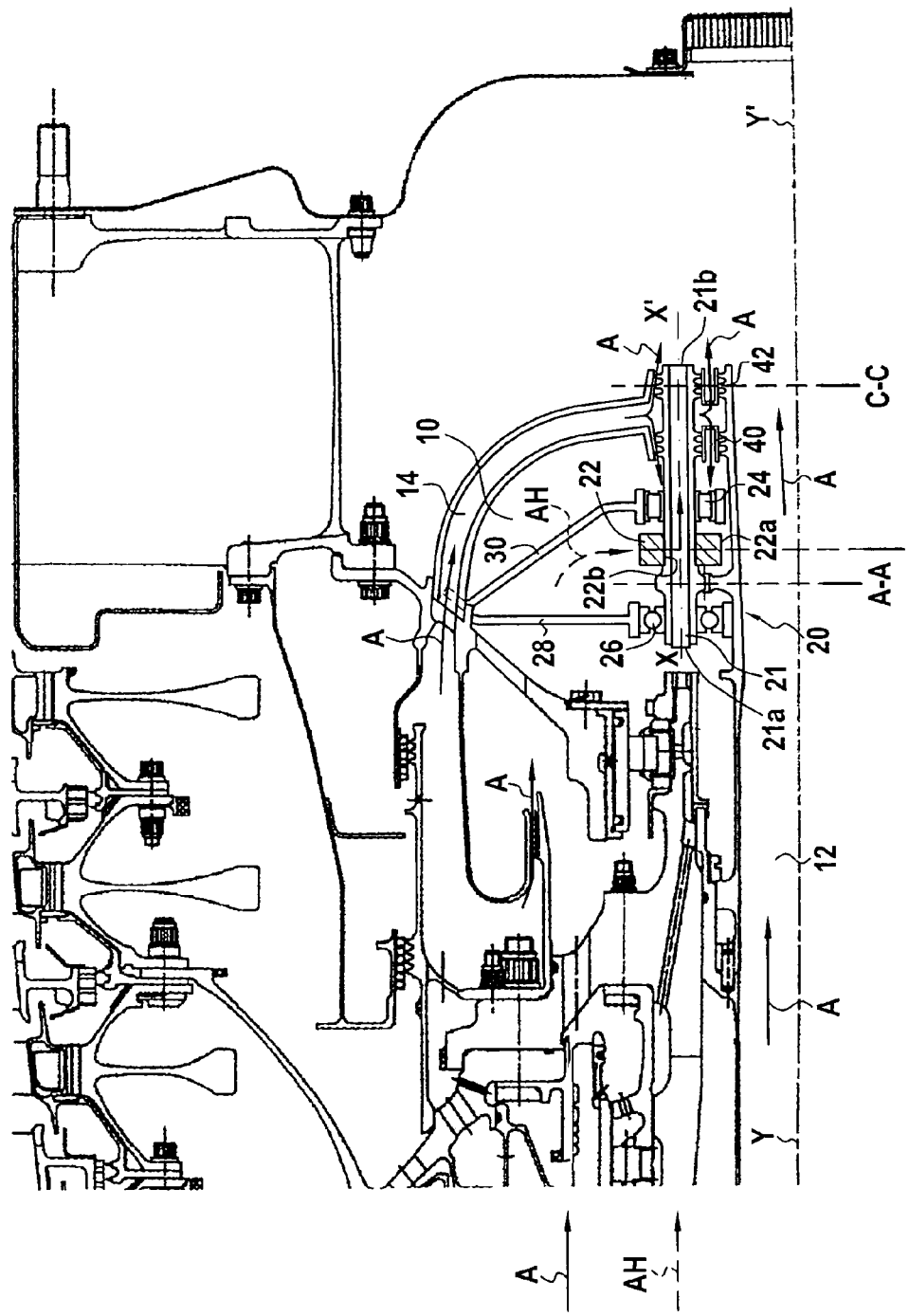
FIG. 2 is an axial section view of a rear bearing enclosure of a turbojet fitted with a de-oiler system in accordance with the invention.

In FIG. 3C, there can seen once more the hollow rotary shaft 12, and the hollow rotary axle 21, these two hollow shaft/axle being provided with "wipers" 50 and 52 constituting the labyrinth gaskets 40 and, more specifically, 42.

In the above description, the de-oiler structure is mounted in the rear bearing enclosure, which corresponds to the best solution economically speaking. Nevertheless, a de-oiler structure could naturally equally well be mounted in a front bearing enclosure, or indeed in both enclosures.

What is claimed is:

1. A de-oiler system for an aircraft engine having a casing defining a volume containing a rotary shaft and a mixture of air and oil for processing, the de-oiler system comprising:
a hollow rotary axle distinct from said rotary shaft;
a de-oiler structure fastened to said hollow rotary axle and rotating together with said hollow rotary axle, said de-oiler structure having an inlet first face communicating with said volume and an outlet second face connected to a passage provided in said hollow rotary axle; and
a transmission device between said hollow rotary axle and said rotary shaft for communicating to said rotary hollow axle a speed of rotation V about its axis in such a manner that said speed of rotation V is greater than a speed of rotation v of said rotary shaft, whereby the mixture of air and oil in said volume within said casing moves towards the inlet first face of said de-oiler structure to remove the oil contained therein and air is collected via said passage of the hollow rotary axle.

2. A de-oiler system according to claim 1, wherein the axes of said hollow rotary axle and of said rotary shaft are parallel.

3. A de-oiler system according to claim 2, wherein said transmission device includes a first pinion mounted on said hollow rotary axle co-operating with a second pinion mounted on said rotary shaft.

4. A de-oiler system according to claim 1, wherein said hollow rotary axle passes through a wall of said casing and wherein a labyrinth type gasket is interposed between said hollow rotary axle and the wall of said casing.

5. A de-oiler system according to claim 1, further including bearings secured to a wall of said casing and in which said hollow rotary axle is mounted to rotate.

6. A de-oiler system according to claim 1, wherein said de-oiler structure is in the form of a cylindrical sleeve with its inlet first face being its outer cylindrical face and its outlet second face being its inner cylindrical face.

7. A de-oiler system according to claim 1, wherein the de-oiler structure is of the metal foam type.

8. An aircraft engine, including a de-oiler system according to claim 1, mounted in an enclosure associated with front and/or rear bearings.

9. A de-oiler system according to claim 1, wherein said hollow rotary axle is disposed above said rotary shaft in a radial direction.

10. A de-oiler system according to claim 1, wherein a first end of the hollow rotary axle is closed and a second end of the hollow rotary axle is open so as to allow air to be recovered from the outlet of the de-oiler structure.

11. A de-oiler system according to claim 1, wherein the first end of the hollow rotary axle is disposed upstream from the second end of the hollow rotary axle.

12. A de-oiler system according to claim 5, wherein the bearings are mounted in support structures which are secured to a rear bearing enclosure.

* * * * *